(12) United States Patent
Chang

(10) Patent No.: US 7,080,497 B2
(45) Date of Patent: Jul. 25, 2006

(54) HORSE HOODS AND METHODS OF MAKING

(75) Inventor: Chia-Wei Chang, Menlo Park, CA (US)

(73) Assignee: Eastwest International (Taiwan) Enterprises, Taichung (TW)

( * ) Notice: Subject to any disclaimer, the term of this patent is extended or adjusted under 35 U.S.C. 154(b) by 0 days.

(21) Appl. No.: 10/993,166

(22) Filed: Nov. 18, 2004

(65) Prior Publication Data

US 2006/0101792 A1    May 18, 2006

(51) Int. Cl.
*B68C 5/00* (2006.01)
*A01K 13/00* (2006.01)

(52) U.S. Cl. .......................... 54/79.2; 54/79.1; 119/855

(58) Field of Classification Search ................ 119/850, 119/855; 54/79.1–79.4; D30/144, 145
See application file for complete search history.

(56) References Cited

U.S. PATENT DOCUMENTS

| 9,629 | A | * | 3/1853 | Simpson | 227/73 |
|---|---|---|---|---|---|
| 215,983 | A | * | 5/1879 | Simpson | 54/79.2 |
| 581,386 | A | * | 4/1897 | Aberson | 54/79.1 |
| 585,306 | A | * | 6/1897 | Dailey | 54/79.2 |
| 785,021 | A | * | 3/1905 | Reid | 54/79.2 |
| 2,222,705 | A | * | 11/1940 | Conlon | 54/79.1 |
| 4,214,421 | A | * | 7/1980 | Battle et al. | 54/79.2 |
| 5,271,211 | A | * | 12/1993 | Newman | 54/79.2 |
| 5,361,563 | A | * | 11/1994 | Llamas | 54/79.2 |
| D423,737 | S | * | 4/2000 | MacGuinness | D30/145 |
| 6,408,604 | B1 | | 6/2002 | Schneider | |
| 6,467,244 | B1 | | 10/2002 | Kelley | |
| 6,574,948 | B1 | * | 6/2003 | Longtin | 54/79.2 |

FOREIGN PATENT DOCUMENTS

| GB | 2399483 A | * | 9/2004 |
|---|---|---|---|
| WO | WO84/00666 | * | 3/1984 |

OTHER PUBLICATIONS

*Classic Cover-Ups* webpage, http://www.kellystackshop.com, Aug. 19, 2004, 2 pages.
*80 NS Duo-Layer Nylon Hood* webpage, http://www.valleyvet.com, Jan. 1, 2005, 2 pages.
*Pan Am Blanket Hood* webpage, http://www.valleyvet.com, Jan. 1, 2005, 2 pages.

* cited by examiner

*Primary Examiner*—Son T. Nguyen
(74) *Attorney, Agent, or Firm*—Townsend and Townsend and Crew LLP

(57) ABSTRACT

Horse hoods, horse neck covers, and methods of making same which result in at least improved fit and comfort, are provided herein. One such horse hood or neck cover includes a base portion (110), an upper neck portion (120), and a gusset (140) coupled between the base portion and the upper neck portion. Each of the portions and gusset may be generally symmetric relative to a common centerline (160). The gusset is adapted to provide a hinged movement of the upper neck portion relative to the base portion when the upper neck portion is rotated relative to the base portion. In this manner, the neck cover has an expansion feature when a horse (300) or other animal wearing it lowers its head, to graze, drink, eat, or the like.

24 Claims, 4 Drawing Sheets

HORSE HOODS AND METHODS OF MAKING

BACKGROUND OF THE INVENTION

The present invention relates generally to horse covers, and more specifically, to horse hoods, horse neck covers, and methods of making same which provide improved fit and comfort.

Horse blankets are commonly used to keep horses warm when they are not being ridden or worked. Blankets may range from a thin summer sheet similar to a T-shirt, to a thicker winter blanket. Blankets for outdoor use may be waterproof, while blankets used only in stables or indoors may not be waterproof. In addition to blankets, neck covers and hoods also may be used to keep the horse warm, and in some cases dry. Horse hoods may extend along a horse's neck and cover a portion of the horse's face. Horse neck covers may extend along the horse's neck, but stop behind the ears. Horse neck covers and hoods often are used in conjunction with the horse blankets.

Unfortunately, horse hoods and neck covers can restrict the horse's neck movements, particularly when connected to the horse blanket. For example, when the horse bends its head down, the neck cover can pull on the blanket, causing it to lift up and be misshaped. Even stretchable neck covers provide resistance to the horse's movement, due at least in part to the stretching of the material. Improvements are desired in at least fit and comfort.

BRIEF SUMMARY OF THE INVENTION

The present invention relates generally to horse covers, and more specifically, to horse hoods, horse neck covers, and methods of making same. Horse hoods and neck covers of the present invention are designed to provide improved fit and/or greater comfort when in use on the horse. While described as a horse neck cover, neck covers of the present invention also may be used with other draft animals, farm animals, or domesticated pets. A neck cover according to one embodiment of the present invention includes a base portion, an upper neck portion, and a gusset coupled between the base portion and the upper neck portion. Each of the portions may be generally symmetric relative to a common centerline. The gusset is adapted to provide a hinged movement of the upper neck portion relative to the base portion when the upper neck portion is rotated relative to the base portion. In this manner, the neck cover has an expansion feature when the horse or other animal wearing it lowers its head, to graze, drink, eat, or the like.

In one aspect, the gusset is hingedly coupled to a lower edge of the base portion and a lower edge of the upper neck portion. In one aspect, the gusset is generally disposed under the base portion and the upper neck portion when the base portion and upper neck portion are in a first positional relationship. The gusset may be a foldable, generally triangular-shaped insert disposed between the base portion and the upper neck portion.

In some aspects, the base portion is adapted to be coupled to a horse blanket, and/or the upper neck portion further includes a face cover portion. In this later embodiment, the face portion covers at least a portion of the horse's face, forelock, forelock, poll, crest, nose, ears, and the like.

In one embodiment, the base portion and/or upper neck portion includes a generally wind resistant outer material around a filler material. The gusset also may be a wind resistant material. In some embodiments, the gusset does not have a filler material to facilitate folding of the gusset material under and/or between the base and upper neck portions. Couplers also may be included for coupling together opposing edges of the upper neck portion, and/or opposing edges of the base portion. In this manner, the neck cover is maintained on the horse.

In another embodiment, a horse neck cover according to the present invention has right and left side portions adapted to lie along a horse's neck and extend down the right and left sides of the horse's neck, respectively. The horse neck cover includes a first segment having right and left side edges and a front edge. The first segment may be coupled to a horse blanket in some embodiments. A second segment is coupled to the first segment right and left side edges. In some aspects, the first and second segments each have a crown portion positioned generally symmetrically between the respective right and left side edges. The crown portion or center line is adapted to lie along the horse's neck. A gusset is coupled between the first segment front edge and the second segment back edge. The gusset is adapted to allow relative rotational movement of the second and first segments.

In one aspect, the relative rotational movement includes a rotational movement of the second segment relative to the first segment about an axis of rotation generally formed where the second segment is coupled to the first segment right and left side edges. The relative rotational movement is provided by a horse lowering its head or neck in some aspects. In another aspect, a common seam is formed by the right side edges of the first and second segments to which the gusset is coupled. Similarly, a common seam may be formed by coupled left side edges of the first and second segments to which the gusset is coupled.

In one aspect, the gusset has its greatest length between the first segment front edge and the second segment back edge at the crown portions. The gusset may further comprise a foldable material which is adapted to fold between the first and second segment crown portions. In this manner, the neck cover has an expandable feature to provide increased comfort and improved fit for the horse.

In one aspect, the gusset is at least partially folded under the first or second segment. This may occur, for example, when the second segment is in a non-rotated state such that the first segment front edge and the second segment back edge are generally adjacent each other. Similarly, the first segment front edge and the second segment back edge are spaced apart when the second segment is in a rotated position. In this position, the gusset may be at least partially exposed between the first segment front edge and the second segment back edge. By moving in this manner, the horse hood or neck cover does not rub unnecessarily on the horse's neck or withers which would cause unnecessary chafing, rubbing or irritation to the horse's neck or withers. If coupled to a blanket, the gusset helps prevent or reduce the likelihood that the blanket will be pulled upward or otherwise move out of place when the horse lowers its head.

The present invention further provides methods of making horse hoods and neck covers. In one embodiment, the method includes providing a base portion having right and left side edges and a front edge, and providing an upper neck portion having right and left side edges and a back edge. The base portion right side edge at the front edge is coupled to the upper neck portion right side edge at the back edge. The base portion left side edge at the front edge is coupled to the upper neck portion left side edge at the back edge. A gusset is coupled between the base portion front edge and the upper neck portion back edge.

In some aspects, the gusset is further coupled to the right side edges and/or the left side edges of the base portion and the upper neck portion. The gusset may comprise a foldable material adapted to fold under the base portion front edge and the upper neck portion back edge. In one aspect, the coupling of the right and left side edges of the base portion and upper neck portion define right and left hinge points adapted to permit relative rotation between the base portion and the upper neck portion.

The base portion may be further coupled to a horse blanket, and a face cover may be further coupled to the upper neck portion. Alternatively, the upper neck portion includes the face cover portion.

Other objects, features, and advantages of the present invention will become more fully apparent from the following description, the appended claims, and the accompanying drawings.

DETAILED DESCRIPTION OF THE INVENTION

Figure 1:
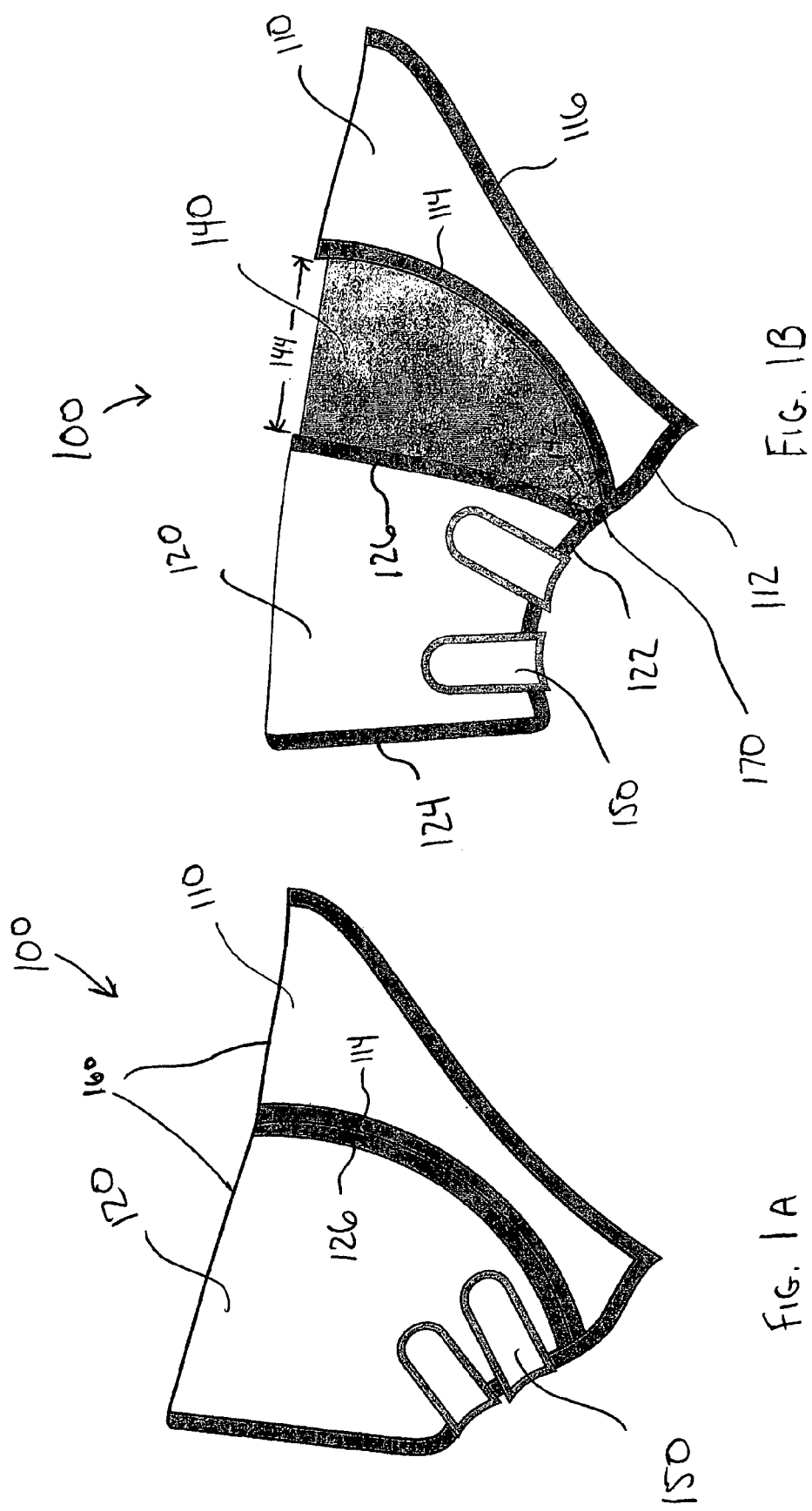
FIGS. 1A–1B are simplified side views of a neck cover according to an embodiment of the present invention.
Figure 3A:
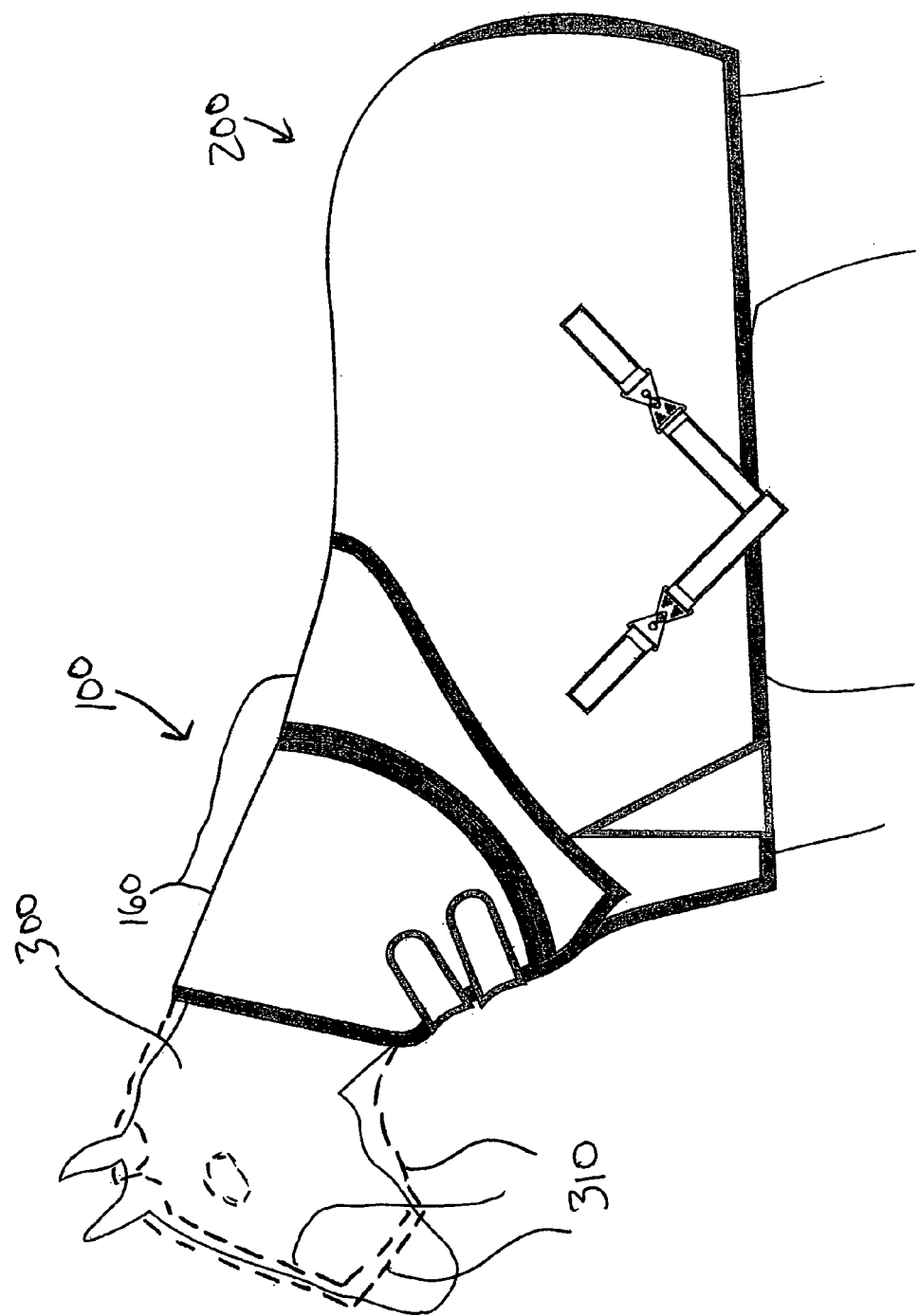
FIGS. 3A–3B are simplified side views of the neck cover of FIGS. 1A–1B on a horse.
Figure 3B:
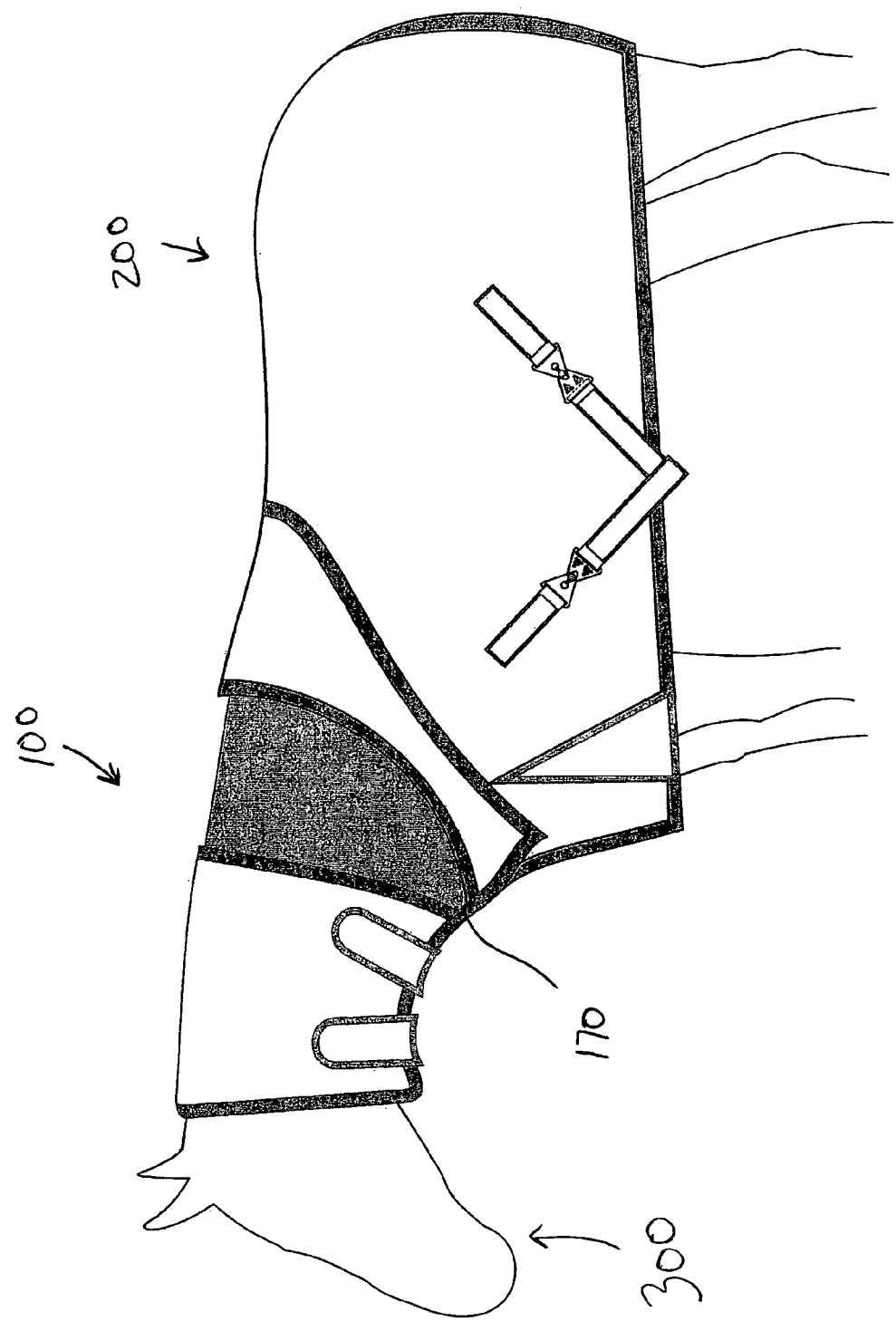

With reference to FIGS. 1A–1B, an embodiment of a horse neck cover 100 according to the present invention will be described. While this embodiment is described having multiple features, alternative embodiments of the present invention may have one or more of these features individually, or in combination. With respect to FIG. 1, in one embodiment horse neck cover 100 has right and left side portions. Only the left side portion is depicted in FIGS. 1A–1B. In a preferred embodiment, horse neck cover 100 is generally symmetrical in shape about a centerline or crown 160. In this embodiment, the right side portion of neck cover 100 will have at least some of the features depicted in the left side portion. It will be appreciated by those skilled in the art that the use of the terms front, back, top, bottom, left and right are intended to describe the configuration of neck cover 100 when draped over a horse 300 as shown in FIGS. 3A–3B. When neck cover 100 is not on a horse, the front, back, left, and right nomenclature may be reversed or altered.

Neck cover 100 includes a first segment 110 and a second segment 120. In one embodiment, first segment 110 is a base portion 110 and second segment 120 is an upper neck portion 120. As can be seen in FIG. 1B, a gusset 140 is disposed between first portion 110 and second portion 120. In one embodiment, gusset 140 is coupled to both portions 110 and 120 by a stitching, by a separate strip of material, with an adhesive, or the like. In a particular embodiment, gusset 140 is coupled to a front edge 114 of first portion 110 and is coupled to a back or rear edge 126 of second portion 120. First portion 110 includes a back edge 116 and a side edge 112. In the embodiment depicted in FIG. 1B, side edge 112 is a left side edge when neck cover 100 is disposed on a horse.

Second portion 120 includes a front edge 124 and a side edge 122. In one embodiment, side edges 122 and 112 are coupled together. In a particular embodiment, side edges 122 and 112 define a single seam extending from back edge 116 to front edge 124. The seam may comprise the same materials as portions 110 and 120, or a different material. In some embodiments, second portion 120 further includes one or more couplers 150. In a particular embodiment, coupler 150 wraps underneath the horse's neck or throatlatch, and is used for coupling a right side of second portion 120 to the depicted left side of second portion 120. Coupler 150 may be a wide range of couplers including, for example, a hook and loop fastener such as Velcro®.

When neck cover 100 is in a first configuration, rear edge 126 of second portion 120 and front edge 114 of first portion 110 are disposed generally adjacent each other. In this configuration, gusset 140 is disposed at least partly under first portion 110 and/or second portion 120. In another embodiment, gusset 140 folds, collapses, scrunches or otherwise compresses together underneath first portion 110 and/or second portion 120. In some embodiments, a portion of gusset 140 may be disposed between back edge 126 and front edge 114 when neck cover 100 is in the configuration shown in FIG. 1A.

When the wearer of neck cover 100 lowers their head or neck, neck cover 100 takes on the second configuration as depicted in FIG. 1B. More specifically, a relative rotation occurs between first and second portions 110 and 120. Typically, second portion 120 rotates relative to the first portion 110. This rotation may occur about a rotation point or rotation region 170, that is generally at the interface between edges 122 and 112. The counter clockwise rotation of second portion 120 (as depicted in FIG. 1B) causes rear edge 126 to separate from front edge 114, exposing some or all of gusset 140. In this manner, first portion 110 does not significantly move, slide, or pull when the wearer of neck cover 100 causes a rotation of second portion 120. Instead, first and second portions 110, 120 separate to expose gusset 140. Further, gusset 140 is, in one embodiment, not a substantially stretchable material. As a result, there is no resistance to the rotation of second portion 120 relative to first portion 110. Rotation of second portion 120 causes gusset 140 to unfold, unfurl, unbunch, or the like. Hinge point or rotation regions 170 may be a fixed seam portion coupling edges 112 and 122. In alternative embodiments, hinge point 170 may include a rotation device to permit rotation of edge 122 relative to edge 112. This may include a pin, a spool-shaped device, a grommet, or the like adapted to permit the relative rotation between portions 110 and 120.

As depicted in FIG. 1B, gusset 140 may comprise a generally triangular-shaped gusset. In this embodiment, gusset 140 may have a shorter length 142 adjacent edges 122 and 112, and a longer length 144 along crown 160.

In one embodiment, first and second portions 110 and 120 are made of nylon, wool, cotton, other natural or synthetic fibers, or the like. The material may be breathable, to allow perspiration or other liquid to evaporate through the material of portions 110, 120. In a particular embodiment, first and second portions 110, 120 comprise a generally wind resistant material to protect the wearer of neck cover 100 from wind, rain, and other elements. In one embodiment, first and second portions 110, 120 comprise one or more sheets of wind resistant material disposed around a filler material. The filler material may comprise a wool, cotton, polyester, foam, or other filling. The filler material is adapted to provide additional warmth to the wearer of neck cover 100.

In one embodiment, gusset 140 comprises the same or identical materials as first and second portions 110 and 120. In one embodiment, gusset 140 also includes a filler material disposed within an outer, generally wind-resistant material. In another embodiment, the filler material of gusset 140 is of reduced thickness compared to the filler material of first and second portions 110, 120. In this manner, gusset 140 folds more easily under and/or between first and second portions 110, 120. In another embodiment, gusset 140 comprises a generally wind-resistant material similar or identical to that used in the outer layer of first and second portions 110 and 120, but does not include a filler material. This further increases the ability of gusset 140 to fold, collapse, scrunch, or otherwise fit under and/or between first and second portions 110 and 120.

In one embodiment, neck cover 100 is manufactured by providing first portion 110 and second portion 120 as generally depicted in FIG. 1A. The first portion edge 112 is coupled to the second portion edge 122 on both the right and left sides, and on the left side depicted in 1B. This coupling of edges 122 and 112 may, in one aspect, include sewing a single seam or strip of edge material along or over edges 112 and 122. Gusset 140 is coupled between the first portion front edge 114 and second portion rear edge 126. Gusset 140 may be coupled to front edge 114 by stitching or otherwise attaching a seam or hem to the first portion 110 and gusset 140. Gusset 140 may be coupled to rear edge 126 by stitching or otherwise coupling a seam or hem to second portion 120 and gusset 140. Gusset 140 may be further coupled to edges 122 and 112 on the left and right side of neck cover 100. The coupling of gusset 140 to edges 112, 114, 122 and/or 126 may occur before, during, or after edges 112 and 122 are coupled together.

In one embodiment, neck cover 100 further includes a face cover (not shown in FIGS. 1A–B). For example, neck cover 100 may include an extension of second portion 120 that is adapted to extend over a portion of the horse's head and may cover some or all of the horse's face. In one embodiment, the face cover includes cutout portions adapted to receive the horse's ears, and may also include eyeholes so that the horse can see through the face cover. In another embodiment, the face cover is coupled to front edge 124 using a variety of coupling devices including Velcro, adhesive, stitching, or the like. In this manner, a customized face cover may be affixed to neck cover 100 in one embodiment.

As previously noted, in some embodiments neck cover 100 is used in conjunction with a blanket 200. Blanket 200 may be a wide range of blanket types, thickness, sizes and the like. Blanket 200 may be made from one or more sheets or pieces of waterproof blanket material, or non-waterproof material. In some embodiments, blanket 200 is a multi-layered blanket for use in colder climates or seasons. Alternatively, blanket 200 is a thinner material for use in warmer climates or warmer seasons. Blanket 200 may comprise some or all of the same material as neck cover 100.

Figure 2:
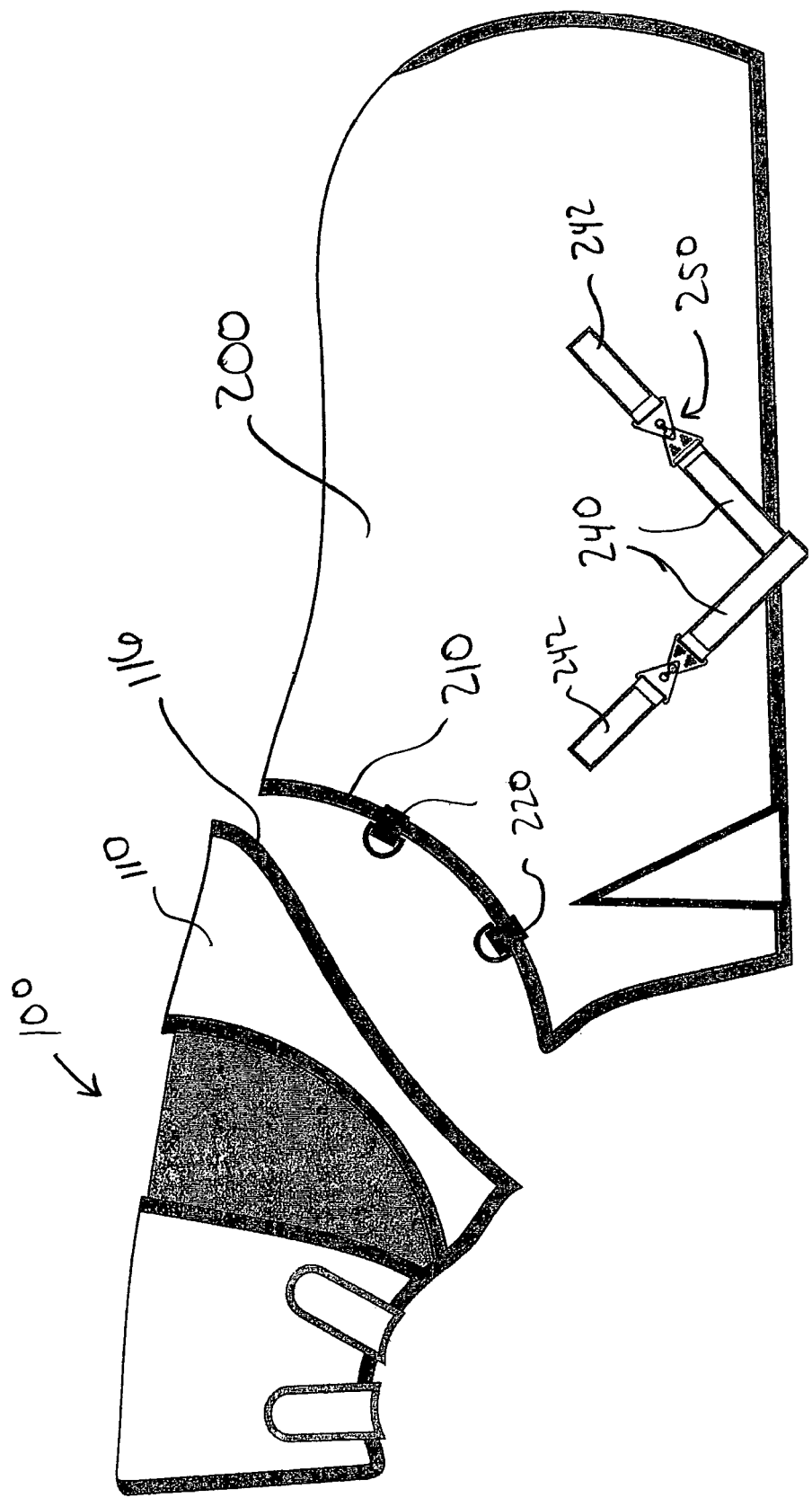
FIG. 2 is a simplified side view of the neck cover of FIGS. 1A–1B for use with a horse blanket.

In one embodiment, blanket 200 includes one or more couplers to hold the blanket on the horse. For example, in one embodiment, the coupler includes one or more belly bands. As shown in FIG. 2, a first band portion 242 is stitched or otherwise attached to the left side portion of blanket 200. A second band portion 240 couples to first band portion 242 using a coupling device 250. Second band portion 240 has an end or other segment that is coupled, stitched or otherwise attached to the right side portion of blanket 200 (not seen in FIG. 2). Second band 240 then extends underneath the horse to attach to first band portion 242. Coupling device 250 operates to hold band portions 240 and 242 together to help maintain blanket 200 on a horse. As shown in FIG. 2, in one embodiment two crossing second band portions 240 are used to help affix blanket 200 to a horse. Other band arrangements or combinations may be used within the scope of the present invention. For example, a single combination of band portions 240, 242 may be used. Alternatively, two bands are used that do not cross as depicted in FIG. 1. Other coupling mechanisms also fall within the scope of the present invention.

Additional details on blanket 200, and coupling devices 250 for use with the present invention are found in U.S. patent application Ser. No. 10/949,727, entitled "*Surcingle Sets and Methods of Making*," and U.S. patent application Ser. No. 10/949,726, entitled "*Horse Blankets And Methods of Making*," both filed Sep. 24, 2004, both assigned to the assignee of the present invention, and the complete disclosures of both incorporated herein by reference.

In some embodiments, blanket 200 further includes one or more couplers 220 for coupling a blanket front edge 210 to neck cover 100 as schematically depicted in FIG. 2. Front edge coupler 220 may include a coupling mechanism similar to coupler 250 in one embodiment. In another embodiment, coupler 220 comprises a ring that is sewn or otherwise attached to blanket 200. Neck cover 100, and more specifically base portion 110, includes a coupling apparatus (not shown) adapted to engage and/or be coupled with coupler(s) 220. For example, base portion 110 may include one or more ring couplers, lobster claw couplers, surcingle components, latches, belts, snaps, zippers, elastic, or the like that are adapted to connect to coupler(s) 220. In one embodiment, the coupler(s) associated with base portion 110 are disposed on an inner surface of base portion 110. This coupler is adapted to engage coupler 220. In another embodiment, the couplers of base portion 110 are disposed near or at back edge 116. In still another embodiment, neck cover 100 is integrally formed with blanket 200, so that separate couplers are not needed. In another embodiment, neck cover 100 is sewn to blanket 200. In particular, neck cover second portion back edge 116 may be sewn to blanket front edge 210.

FIGS. 3A and 3B depict neck cover 100 used by a horse 300. Neck cover 100 as depicted is used in conjunction with blanket 200. However, in other embodiments neck cover 100 is used without blanket 200. Neck cover 100 may be coupled to blanket 200 as described in conjunction with FIG. 2. In another embodiment, neck cover 100 has a sufficiently sized first portion 110 that extends over at least a portion of blanket 200. For example, first portion 110 may extend over the withers portion of blanket 200. In this embodiment, coupling device between 100 and 200 may not be needed, or alternatively is hidden under first portion 110.

FIG. 3A depicts neck cover 100 showing centerline 160 generally falling along the horse's neckline and a portion of the horse's withers. Again, depending on the size of neck cover 100, the crown or centerline 160 of neck cover 100 may extend along the centerline of the horse's back. In some embodiments, neck cover 100 includes a face cover or hood portion, as schematically shown by dotted lines 310. The face cover or hood portion may be coupled to second portion 120 using a variety of fasteners including ones similar to coupler 220 or base portion 110 coupler(s). In an alternative embodiment, the face cover or hood portion is sewn to second portion 120. In still another embodiment, second portion 120 is integrally formed with a face cover or hood portion. In this embodiment, front edge 124 lies along the horse's nose.

FIG. 3B depicts horse 300 extending their head forward or lowering their head such that neck cover 100 operates as previously described. More specifically, the lowering of the neck or head of horse 300 causes a rotation of second portion 120 relative to first portion 110 about hinge region 170. As a result, gusset 140 is exposed, but gusset 140 still provides a protective cover to the horse's neck. Further, the rotation of neck cover 100 as depicted in FIG. 3B minimizes or helps prevent tugging or pulling on first portion 110. In the embodiment in which neck cover 100 is not coupled to blanket 200, the rotation of the horse's head causing gusset 140 to be exposed helps prevent or minimize the movement of first portion 110 relative to blanket 200. In this manner, the two components covering horse 300 are not moving or sliding relative to each other to any significant degree. As a result, increased comfort and fit are provided for horse 300. In embodiments in which neck cover 100 is coupled to blanket 200, the expansion of neck cover 100 by exposing gusset 140 also reduces or eliminates pulling on blanket 200 causes by the movement of horse 300's neck or head. Again, increased comfort and fit may be achieved.

The invention has now been described in detail. However, it will be appreciated that the invention may be carried out in ways other than those illustrated in the aforesaid discussion, and that certain changes and modifications may be practiced within the scope of the appended claims. Accordingly, the scope of this invention is not intended to be limited by those specific example, but rather to be accorded the scope represented in the following claims.

What is claimed is:

1. A horse neck cover, comprising:
    a base portion;
    an upper neck portion that is hingedly attached to the base portion underneath the neck of the horse ; and
    a gusset coupled between the base portion and the upper neck portion;
    wherein the gusset is adapted to provide a hinged movement of the upper neck portion relative to the base portion when the upper neck portion is rotated relative to the base portion to cause the upper neck portion to separate from the base portion at the crown portion of the neck of the horse.

2. The horse neck cover as in claim 1 wherein the gusset is generally disposed under the base portion and the upper neck portion when the base portion and upper neck portion are in a first positional relationship.

3. The horse neck cover as in claim 1 wherein the gusset comprises a foldable insert disposed between the base portion and the upper neck portion, the insert having a generally triangular shape.

4. The horse neck cover as in claim 1 wherein the base portion is adapted to be coupled to a horse blanket.

5. The horse neck cover as in claim 1 wherein the upper neck portion further comprises a face cover portion.

6. The horse neck cover as in claim 1 wherein the base portion comprises a generally wind resistant outer material around a filler material.

7. The horse neck cover as in claim 1 wherein the upper neck portion comprises a generally wind resistant outer material around a filler material.

8. The horse neck cover as in claim 1 wherein the gusset comprises a generally wind resistant material.

9. The horse neck cover as in claim 1 wherein the base portion, the upper neck portion and the gusset are generally symmetric relative to a common centerline.

10. The horse neck cover as in claim 1 further comprising a coupler for coupling together opposing edges of the upper neck portion.

11. The horse neck cover as in claim 1 further comprising a coupler for coupling together opposing edges of the base portion.

12. A horse neck cover having right and left side portions adapted to lie along a horse's neck and extend down the right and left sides of the horses neck, respectively, the horse neck cover comprising:
    a first segment having right and left side edges and a front edge;
    a second segment coupled to the first segment right and left side edges, the second segment having a back edge, wherein the second segment is hingedly attached to the first segment underneath the neck of the horse ; and
    a gusset coupled between the first segment front edge and the second segment back edge, the gusset adapted to allow relative rotational movement of the second and first segments at the crown portion of the horse's neck.

13. The horse neck cover as in claim 12 wherein the first segment is adapted to be coupled to a horse blanket.

14. The horse neck cover as in claim 12 wherein the relative rotational movement comprises a rotational movement of the second segment relative to the first segment about an axis of rotation generally formed where the second segment is coupled to the first segment right and left side edges.

15. The horse neck cover as in claim 12 wherein the relative rotational movement is provided by a lowering of the horse's neck by the horse.

16. The horse neck cover as in claim 12 wherein the second segment further comprises right and left side edges.

17. The horse neck cover as in claim 16 wherein the right side edges of the first and second segments define a common seam to which the gusset is coupled.

18. The horse neck cover as in claim 16 wherein the left side edges of the first and second segments define a common seam to which the gusset is coupled.

19. The horse neck cover as in claim 18 wherein the gusset has its greatest length between the first segment front edge and the second segment back edge at a crown portion.

20. The horse neck cover as in claim 18 wherein the gusset comprises a foldable material which is adapted to fold between the first and second segment crown portions.

21. The horse neck cover as in claim 12 wherein the first segment front edge and the second segment back edge are generally adjacent each other when the second segment is in a non-rotated position.

22. The horse neck cover as in claim 21 wherein the gusset is at least partially folded under the first or second segment.

23. The horse neck cover as in claim 12 wherein the first segment front edge and the second segment back edge are spaced apart when the second segment is in a rotated position.

24. The horse neck cover as in claim 23 wherein the gusset is exposed between the first segment front edge and the second segment back edge.

* * * * *